(12) United States Patent
Oran et al.

(10) Patent No.: US 7,681,101 B2
(45) Date of Patent: Mar. 16, 2010

(54) HYBRID CORRECTIVE SCHEME FOR DROPPED PACKETS

(75) Inventors: David Oran, Acton, MA (US); William VerSteeg, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/735,930

(22) Filed: Apr. 16, 2007

(65) Prior Publication Data

US 2008/0256409 A1    Oct. 16, 2008

(51) Int. Cl.
    *G08C 25/02* (2006.01)
(52) U.S. Cl. ..................... 714/748; 714/750
(58) Field of Classification Search ........... 714/748, 714/18, 749, 750, 751
    See application file for complete search history.

(56) References Cited

U.S. PATENT DOCUMENTS

| | | | | |
|---|---|---|---|---|
| 6,289,054 | B1 * | 9/2001 | Rhee | 375/240.27 |
| 6,567,929 | B1 * | 5/2003 | Bhagavath et al. | 714/18 |
| 6,782,490 | B2 * | 8/2004 | Maxemchuk et al. | 714/18 |
| 6,865,157 | B1 * | 3/2005 | Scott et al. | 370/242 |
| 7,296,205 | B2 * | 11/2007 | Curcio et al. | 714/748 |
| 2002/0126711 | A1 | 9/2002 | Robinett et al. | |
| 2003/0158899 | A1 | 8/2003 | Hughes | |
| 2003/0236903 | A1 * | 12/2003 | Piotrowski | 709/231 |
| 2004/0071128 | A1 | 4/2004 | Jang et al. | |
| 2005/0078698 | A1 | 4/2005 | Araya et al. | |
| 2005/0198367 | A1 | 9/2005 | Ettikan | |
| 2005/0249231 | A1 | 11/2005 | Khan | |
| 2006/0083263 | A1 | 4/2006 | Jagadeesan et al. | |
| 2006/0188025 | A1 | 8/2006 | Hannuksela | |
| 2006/0242669 | A1 | 10/2006 | Wogsberg | |
| 2007/0204320 | A1 | 8/2007 | Wu et al. | |
| 2007/0268899 | A1 | 11/2007 | Cankaya | |
| 2008/0192839 | A1 | 8/2008 | Gahm et al. | |

FOREIGN PATENT DOCUMENTS

| | | |
|---|---|---|
| WO | 2008033644 | 3/2008 |
| WO | 2008033645 | 3/2008 |
| WO | 2008100725 | 8/2008 |

OTHER PUBLICATIONS

Pendleton, et al., Session Initiation Package for Voice Quality Reporting Event, Sipping Working Group, 2006, pp. 1-24.

(Continued)

*Primary Examiner*—Scott T Baderman
*Assistant Examiner*—Fritz Alphonse
(74) *Attorney, Agent, or Firm*—Stolowitz Ford Cowger LLP

(57) ABSTRACT

In one embodiment, a hybrid packet repair scheme adaptively switches among unicast retransmission, multicast retransmission, and Forward Error Correction (FEC) depending on the receiver population and the nature of the error prompting the repair operation. The NACK patterns are used to heuristically determine the degree of correlation among packet losses. In an additional embodiment, wasting bandwidth and processing on retransmissions of FEC that will fail to correct the errors is avoided by evaluating the nature of the error and the bandwidth needed to optimally repair it. Unicast retransmission, multicast retransmission, or FEC repair is then dynamically performed according to the loss patterns derived from the NACK arrivals and other network conditions.

19 Claims, 8 Drawing Sheets

OTHER PUBLICATIONS

Schulzrinne, et al., RPT: A Transport Protocol for Real-Time Applications, Network Working Group, 2003, pp. 1-92.

USPTO, PCT International Search Report, Jul. 7, 2008, 3 pgs.

Rosenberg, J., et al., "Registration of parityfec MME types", RFC 3009, Nov. 2000, 11 pgs.

Luby, M., et al., "Forward Error Correction (FEC) Building Block", RFC 3452, Dec. 2002, 16 pages.

Luby, M., et al., "Compact Forward Error Correction (FEC) Schemes", RFC 3695, Feb. 2004, 14 pages.

Ott, J., et al., "Extended RTP Profile for RTCP-based Feedback (RTP/AVPF)", draft-ietf-avt-rtcp-feedback-11, Aug. 10, 2004, 52 pages.

Watson, M., "Basic Forward Error Correction (FEC) Schemes", draft-ietf-rmt-bb-fec-basic-schemes-revised-02, Mar. 3, 2006, 17 pages.

Chesterfield, J., et al., "RTCP Extensions for Single-Source Multicast Sessions", draft-ietf-avt-rtcpssm-11, Mar. 6, 2006, 67 pages.

Rey, J., et al., "RTP Retransmission Payload Format", RFC 4588, Jul. 2006, 24 pages.

USPTO, PCT International Search Report, Jul. 7, 2008, 3 pgs. —Different.

Duffy, "Riverstone Recasts Multicast Video", 2 pages, Aug. 5, 2002, Network World Inc., www.networkworld.com/edge/news/2002/0805edge.html.

Lehman et al., Active Reliable Multicast (ARM), 1998, IEEE, pp. 581-589.

U.S. Appl. No. 11/561,237, filed Nov. 17, 2006—Prosecution History.

Liang et al., Feedback suppression in reliable multicast protocol, 2000, IEEE, pp. 1436-1439.

Adamson et al., Negative-Acknowledgment (NACK)-Oriented Reliable Multicast (NORM) Building Blocks (RFC 3941), Nov. 2004, RFC 3941 (IETF, ORG), pp. 1-37.

U.S. Appl. No. 11/736,463, filed Apr. 17, 2007—Prosecution History.

* cited by examiner

HYBRID CORRECTIVE SCHEME FOR DROPPED PACKETS

TECHNICAL FIELD

The present disclosure relates generally to the field of networking.

BACKGROUND

Packet switch networks are now being used to transport streaming media, such as video and audio from a media server to multiple receivers, such as computer terminals and Set Top Boxes (STBs). However, packet switched networks typically use a best effort scheme that may significantly delay or drop some packets. Retransmission schemes have been designed to retransmit the dropped or delayed media packets to receivers.

Unicast retransmissions of multicast streams is an attractive recovery technique when the errors are uncorrelated, such as errors occurring on the individual accesses branches connected to the receivers. This may include errors on subscriber access lines of a Digital Subscriber Loop (DSL) network. In these cases, the probability is small that the packet loss is due to errors on a shared link upstream of the branching to the individual receivers compared to the errors in the individual access links themselves. Conversely, unicast retransmission is a poor solution for either correlated errors or long burst errors. This is primarily because of Negative ACKnowledgment (NACK) implosion where many receivers request retransmissions of the same packets at the same time. The bandwidth multiplication of sending many unicast copies of the same repair packet may prevent packet repair.

DESCRIPTION OF EXAMPLE EMBODIMENTS

Overview

In one embodiment, a hybrid packet repair scheme adaptively switches among unicast retransmission, multicast retransmission, and Forward Error Correction (FEC) depending on the receiver population and the nature of the error prompting the repair operation. The NACK patterns are used to heuristically determine the degree of correlation among packet losses. In an additional embodiment, wasting bandwidth and processing on retransmissions of FEC that will fail to correct the errors is avoided by evaluating the nature of the error and the bandwidth needed to optimally repair it. Unicast retransmission, multicast retransmission, or FEC repair is then dynamically performed according to the loss patterns derived from the NACK arrivals and other network conditions.

Description

Figure 1:
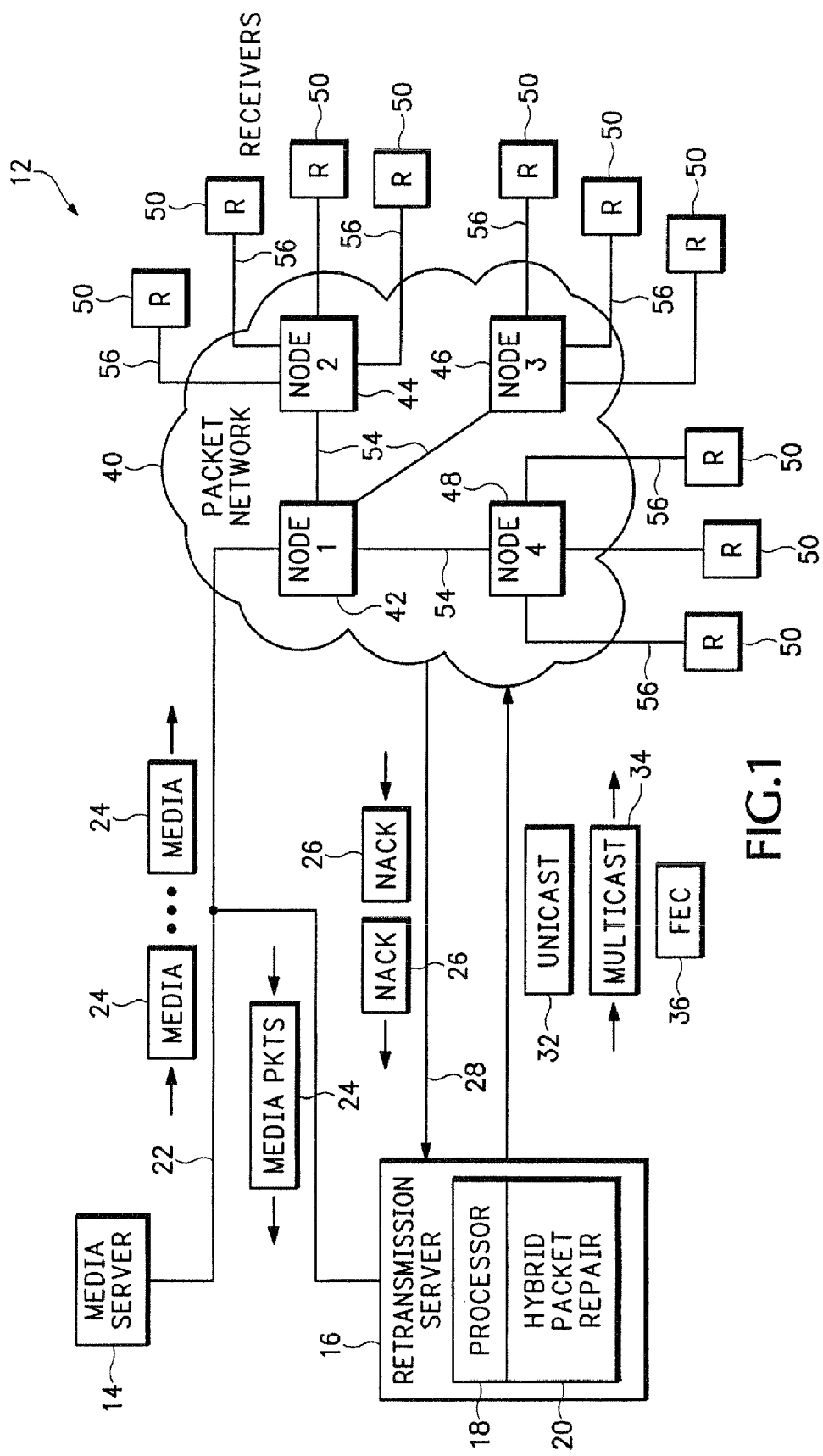
FIG. 1 is a block diagram of a network that uses a hybrid packet repair scheme.

FIG. 1 shows an Internet network 12 that includes a packet switched network 40 that includes multiple different nodes 42-48. The nodes 42-48 may be routers, switches, gateways, call accumulators, or any other network processing device that directs packets 24 to different receivers 50. A media server 14 outputs one or more media streams 22 that each include a sequence of media packets 24. The media server 14 could store the media locally or receive the media from another server or media source via another network, satellite, cable, or any other communication media.

The media server 14 may send the media packets 24 to any combination of different receivers 50 via the packet switched network 40. The receivers 50 can be any device that receives media packets 24. For example, the receivers 50 could be Personal Computers (PCs), Set-Top Boxes (STBs), Personal Digital Assistants (PDAs), Voice Over Internet Protocol (VoIP) phones, Internet connected television, cellular telephones, etc. Any combination of media packets 24 may be dropped, lost, and/or delayed for any number of different reasons at different points along the network paths from media server 14 to the different receivers 50.

A retransmission server is alternatively referred to as a repair point 16 and receives and caches the media packets 22 sent to the receivers 50 by media server 14. Any of the receivers 50 that do not successfully receive any of the media packets 24, sends an associated NACK message 26 back to the retransmission server 16. The retransmission server 16 uses a hybrid packet repair scheme 20 to dynamically send different types of unicast retransmission packets 32, multicast retransmission packets 34, and/or FEC packets 36 according the characteristics of the NACKs 26 received back from the receivers 50.

Analyzing Lost Packets

An error or lost packet refers to any media packet 24 that is not successfully received by one of the intended receivers 50 within an expected time period. A correlated error refers to different packet losses that are related to each other. For example, all of the packet losses identified by receivers 50 connected to node 44 may be due to the same packets being dropped somewhere between node 42 and node 44. Correlated errors can be due to losses/outages on the backbone/regional network upstream of repair point 16. Correlated errors can also be due to losses/outages on the shared links/tunnels 54 through the packet network 40 connecting to the access links 56 for receivers 50. Other correlated errors may relate to common-mode losses on the individual access links 56 due to crosstalk or external impulse events like a lightning strike.

The FEC packets 36 may be used when the error spread is large (i.e. the error affects a random subset of the packets in a particular time window) and the number of lost packets is within the error correction coverage scope. The coverage scope and window are tuned by varying a constant bandwidth overhead and source block size for the FEC stream.

The FEC repair scheme described below may use Digital Video Broadcast (DVB) COP3 and/or Raptor-10 codes, which allow the FEC packets 36 to be sent separately from the main media stream 22 as opposed to error correction schemes that re-encode the original media packets 24 to include the FEC. Of course any other type of error correction scheme which puts the error correction data in different packets from the native media could also be used.

FEC may use more bandwidth than needed when the correlated errors are single packets or short bursts. For example, a single packet or a small group of packets may be identified as lost by multiple receivers 50. In these conditions, a single multicast retransmission using multicast packets 34 may be more efficient than FEC. For example, multicast repair may only need to multicast one lost packet with a single multicast retransmission (barring further errors) that reaches all the receivers identifying the loss. In contrast, the FEC repair may require sending multiple repair packets.

For outages or long burst losses (i.e. too large to be covered by FEC) nothing may work particularly well. This is partly because of the persistent NACK implosion effect, but mostly because the network 12 is rarely engineered for the extra traffic required to support a substantially large amount of retransmission or redundant stream transmission. The hybrid packet repair scheme 20 detects and ignores such errors by distinguishing them from situations where unicast retransmission 32, multicast retransmission 34, or FEC 36 would be effective. This ensures a stable packet repair scheme that does not collapse under large burst loss or outages.

The NACK implosion effect, if not carefully moderated, could be a catastrophic failure mode for any error correction scheme attempting error feedback for multicast streams with large receiver populations. This is because the NACKs 26 both consume reverse channel bandwidth, and also can flood the repair point 16 with control packets. The hybrid packet repair scheme 20 addresses these NACK implosions and uses NACK implosion to detect certain loss patterns and hence turns bursts of NACKs 26 on feedback control channel 28 into an advantage rather than a failure mode.

Figure 2:
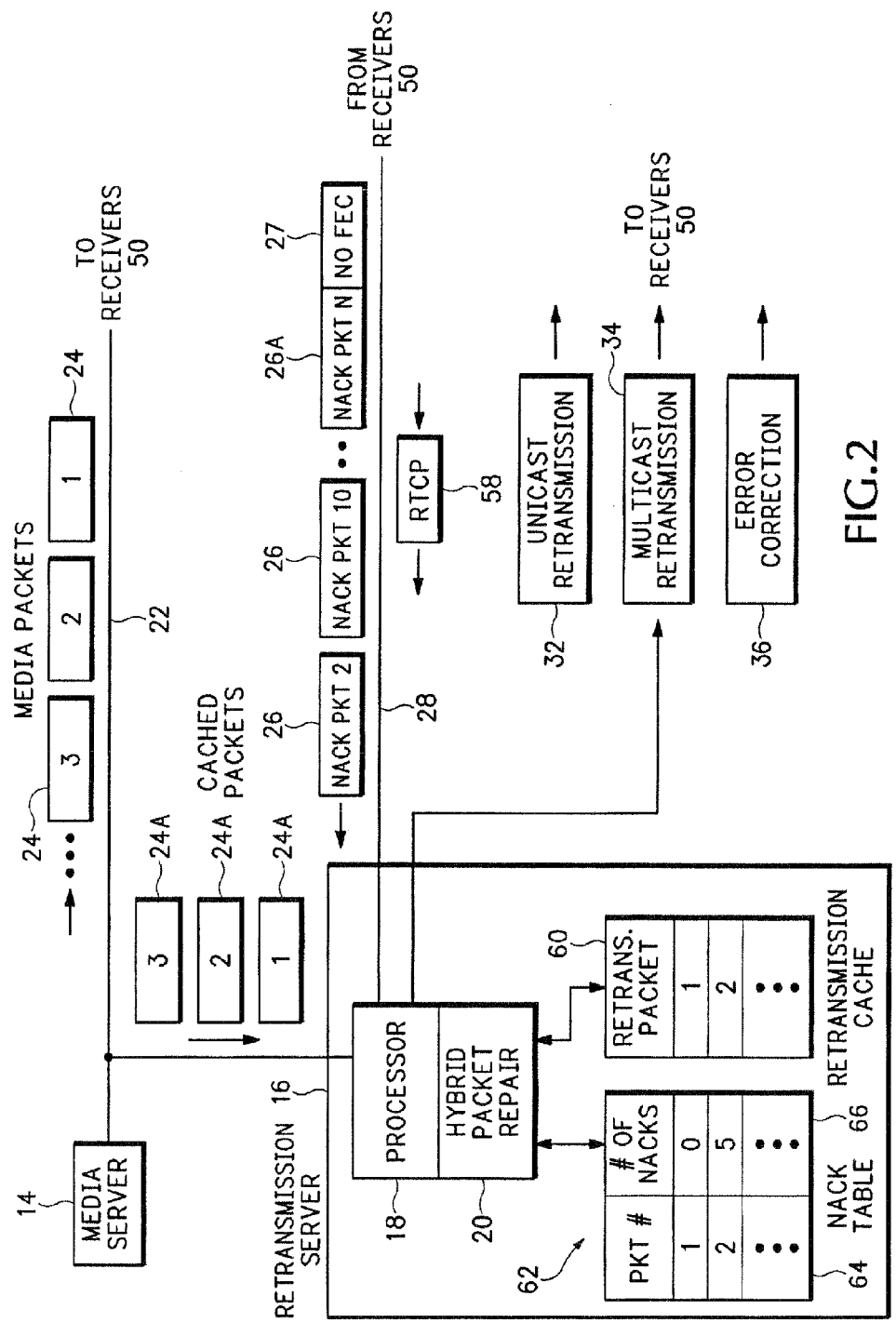
FIG. 2 is a more detailed diagram of repair point that operates the hybrid packet repair scheme shown in FIG. 1.

FIG. 2 shows the retransmission server (repair point) 16 in more detail. The processor 18 operates the hybrid packet repair scheme 20 that in one embodiment are computer executable software instructions. For each media channel 22, the repair point 16 caches the packet data 24A necessary for repairing any of the lost packet in media channel 22. The hybrid packet repair scheme 20 operates in conjunction with a retransmission cache 60 that caches the media packets 24A transmitted by media server 14. Retransmission cache 60 is used in conjunction with a NACK table 62 that counts the number of NACKS 26 received for each cached media packet 24A. For example, the NACKs 26 identify the sequence numbers of a set of lost media packets. Each time a NACK message 26 is received by repair point 16, a NACK count 64 for the associated lost packets 64 are incremented in table 62.

Based on the NACK pattern in NACK table 62, the hybrid packet repair scheme 20 sends different combinations of unicast retransmission packets 32, multicast retransmission packets 34 and/or FEC packets 36 to the receivers 50. The repair packets are used to replace the lost packets identified in the NACK messages 26.

The repair point 16 can also gauge the intensity of a NACK implosion even when NACKs might be lost due to congestion or the inability of the repair point to receive and process all the NACKs 26. The three loss cases of individual loss, correlated loss, and outage on the downstream primary multicast stream 22 can also be analyzed. In the case of correlated loss, the repair point 16 can also determine enough about the loss pattern to choose among unicast packet retransmission, multicast packet retransmission, and FEC repair.

Establishing Media Channels

Still referring to FIG. 2, a given media "channel" 22 has a primary multicast Real Time Protocol (RTP) session along with a corresponding Real Time Control Protocol (RTCP) control channel. The media channel 22 may have a unicast repair RTP/RTCP session which can be established on demand according to the scheme described in US. Patent App. entitled: RETRANSMISSION-BASED STREAM REPAIR AND STREAM JOIN, filed: Nov. 17, 2006, Ser. No. 11/561,237 which is herein incorporated by reference. This RTP/RTCP session may be used for unicast retransmission repair when the hybrid packet repair scheme 20 determines that unicast retransmission is the most effective way to repair a particular error.

A second SSM RTP/RTCP multicast session is added for multicast repair. The multicast retransmissions 34 can be sourced by the same retransmission server 16 at the same source address as the feedback target address for the main multicast RTP session. However, a different destination group address is used. Receivers 50 participating in the repair scheme join or leave this multicast group at the same time they join or leave the main multicast RTP session. This multicast repair session is used for both sending the multicast retransmission packets 34 using the RTP retransmission payload format and for sending FEC repair packets 36 using the native payload type for an in use FEC scheme. The two forms of unicast and multicast retransmission are distinguished by the receivers 50 using standard RTP conventions for payload type multiplexing in a single session.

Other unicast receiver feedback 58 is sent to the feedback address for the primary media session 22, and therefore is available to the retransmission server 16. These RTCP packets 58 in one embodiment are RTCP receiver reports. The retransmission server 16 uses the RTCP reports 58 to estimate the population of receivers 50 that are "homed" on retransmission server 16 for repairs. This receiver population is dynamic and approximate since receivers come and go, RTCP-Receiver Report packets may be lost, and mapping of receivers 50 to repair points can change.

Based on the identified population of receivers 50 and the pattern of NACKs 26, either RTP unicast repair packets 32 are sent via unicast retransmission, RTP multicast repair packets 34 are sent via multicast retransmission, or RTP FEC repair packets 36 are sent using a multicast retransmission.

Selecting Repair Scheme

Figure 3:
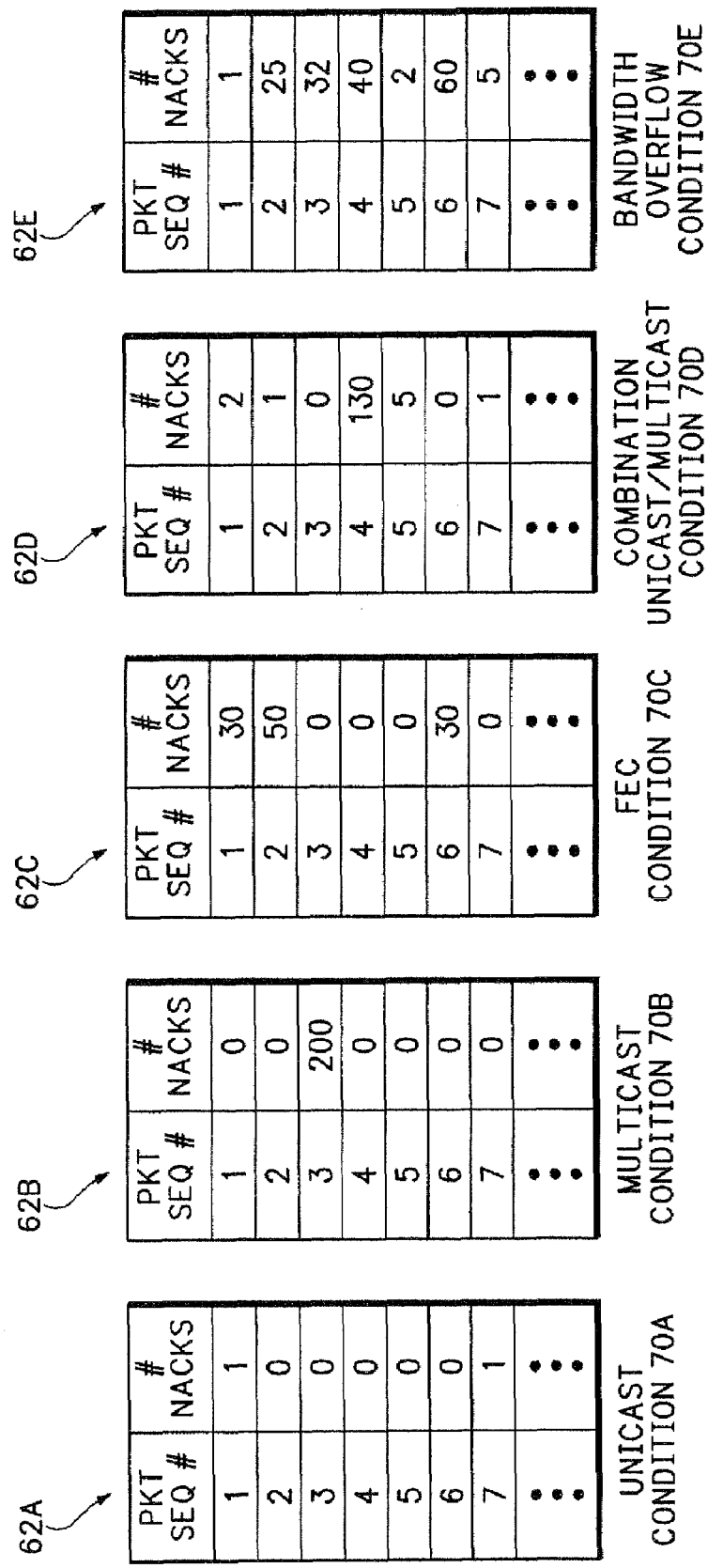
FIG. 3 shows examples of NACK table states used when selecting between different types of repair schemes.

FIG. 3 shows different NACK patterns 70 that may determine the type of repair scheme 32, 34, or 36 used to repair lost packets. It should be understood that the example NACK patterns shown in FIG. 3 are only for illustrative purposes. The actual number of NACKs associated with lost packets and the number of different lost packets considered by the hybrid packet repair scheme 20 may vary according to the network bandwidth, type of transmitted media, number of receivers 50, etc.

In this example, a first NACK pattern 70A in NACK table state 62A shows one NACK received for a first media packet and one NACK was received for a seventh media packet. In this example, the hybrid repair scheme 20 may determine that sending two unicast retransmission packets 32 (FIG. 2) is the most efficient scheme for repairing the two lost packets. For example, sending two unicast retransmission packets 32 would use less total network bandwidth than sending two multicast retransmission packets.

A second example NACK pattern 70B in NACK table state 62B shows several hundred NACKs received only for the third media packet. In this state, the hybrid packet repair scheme 20 may determine that sending one multicast retransmission packet 34 for the third lost packet is most efficient. For example, sending one multicast retransmission packet 34 uses less bandwidth than sending 200 separate unicast packets 32 to each individual receiver sending one of the NACKs 26.

A third example NACK pattern 70C in NACK table state 62C indicates three different packets have been lost by multiple different receivers 50. In this condition, the hybrid packet repair scheme 20 may determine that sending two FEC packets is the most efficient way to repair the lost packets. For example, two FEC packets may be able to repair all three lost packets 1, 2, and 6. Thus, multicasting two FEC packets 36 (FIG. 2) would be more efficient than sending 110 individual unicast retransmission packets 32 or sending three separate multicast retransmission packets 34.

The FEC packets 36 can work with any number of packet-level FEC schemes, and do not require any particular form of FEC. FEC mapping onto IP protocols is described in a large number of Internet Engineering Task Force (IETF) Request For Comments (RFCs) and drafts, such as RFC3009, RFC3452, RFC3695, and therefore is not described in any further detail.

A fourth example NACK pattern 70D in NACK table state 62D indicates five different packets 1, 2, 4, 5, and 7 have been lost. In this case a combination of unicast retransmission packets 32 and multicast retransmission packets 34 may be the most efficient repair scheme. For example, unicast retransmission packets 32 may be sent to the relatively small number of individual receivers that lost packets 1, 2, 5, ad 7 and a single multicast retransmission packet 34 may be sent to all of the receivers 50 for lost packet 4.

A fifth example NACK pattern 70E in NACK table state 62E indicates every one of the packets 1-7 has been lost by different combinations of receivers. In this condition, the hybrid packet repair scheme 20 may determine that there is insufficient bandwidth to repair any of the lost packets and may abort any attempt to repair lost packets.

Figure 4:
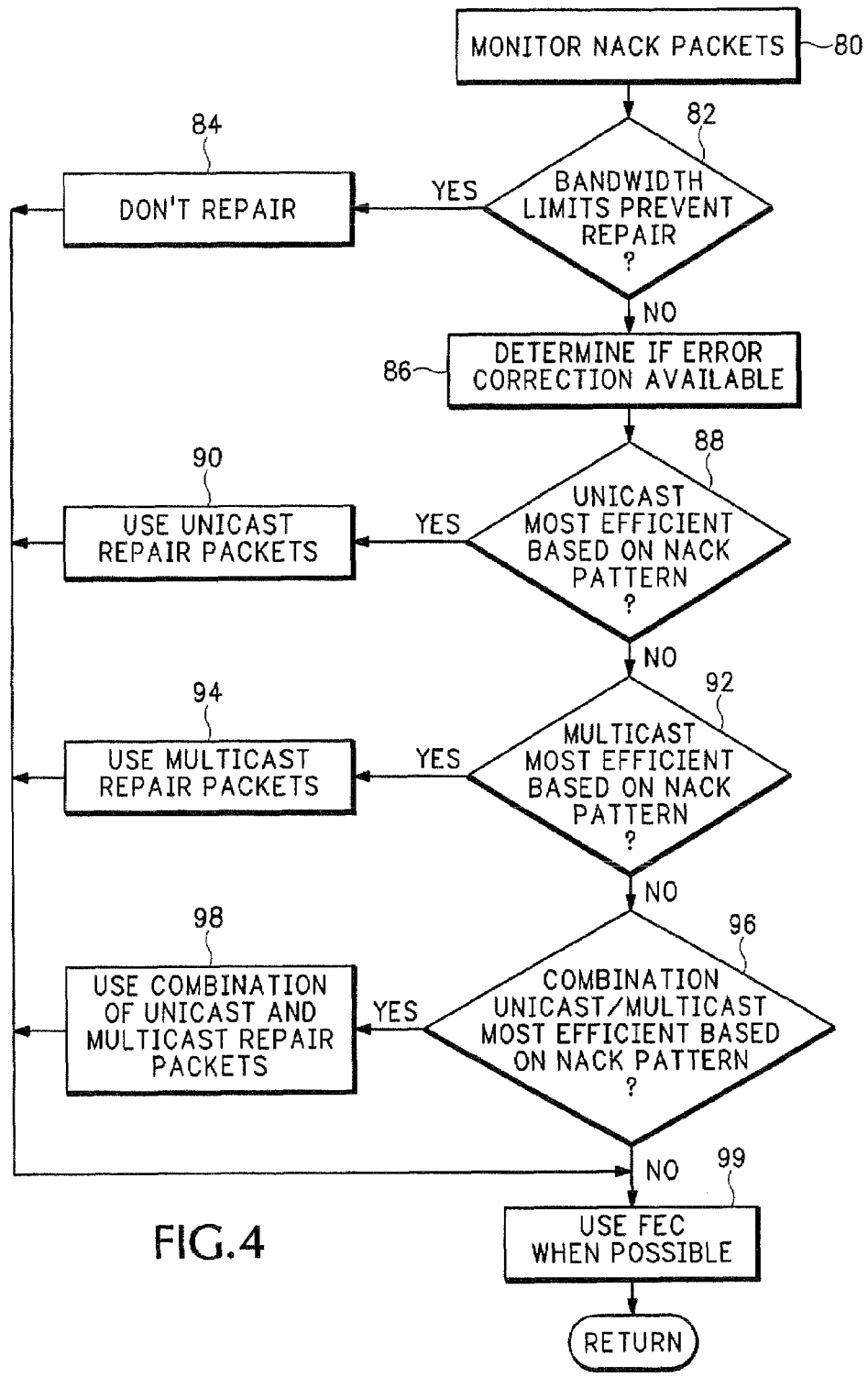
FIG. 4 is a flow diagram showing on a high level the operations performed by the hybrid packet repair scheme shown in FIGS. 1 and 2.

FIG. 4 shows one example of operations performed by the hybrid packet repair scheme 20 in FIGS. 1 and 2. In order to repair the media stream, the repair point 16 needs to determine which packets to retransmit using unicast packets 32, which packets to retransmit using multicast packets 34, whether to switch to FEC-based repair 36 rather than retransmitting, or whether to give up when there is insufficient aggregate bandwidth to sufficiently repair the media stream 22 and satisfy the receivers 50.

In operation 82 the NACK packets 26 (FIG. 2) are monitored. The number and/or pattern of monitored NACKs in combination with limits on network bandwidth may indicate in operation 82 that no repair should be performed. Accordingly, the identified lost media packets 24 are not repaired in operation 84. Otherwise, operation 86 determines if error correction is available for repairing the lost packets. For example, when a limited number of different packets are indicated as lost, error correction packets 36 may be sent to the receivers 50. The receivers then locally recreate the data from the lost packets using the FEC packets 36.

In operation 88, the NACK pattern in table 62 (FIG. 2) may indicate that unicast repair is the most efficient scheme for repairing lost packets. Accordingly, the identified lost packets are sent using unicast retransmissions in operation 90 to the specific receivers identifying the lost packets.

In operation 92, the NACK pattern in table 62 may indicate that multicast retransmission is the most efficient scheme for repairing lost packets. Accordingly, multicast retransmissions of the identified lost packets are sent in operation 94 to all of the receivers in the multicast group. In operation 96, and as described above in FIG. 3, the NACK pattern in table 62 may indicate that both unicast retransmission and multicast retransmission should be used. Accordingly in operation 98 unicast retransmissions of certain lost packets are sent to specific receivers 50 and multicast retransmissions of other lost packets are sent to all of the receivers 50 in the multicast group. In operation 99, forward error correction may be used whenever applicable to improve repair efficiency.

Network Timing Considerations

Figure 5:
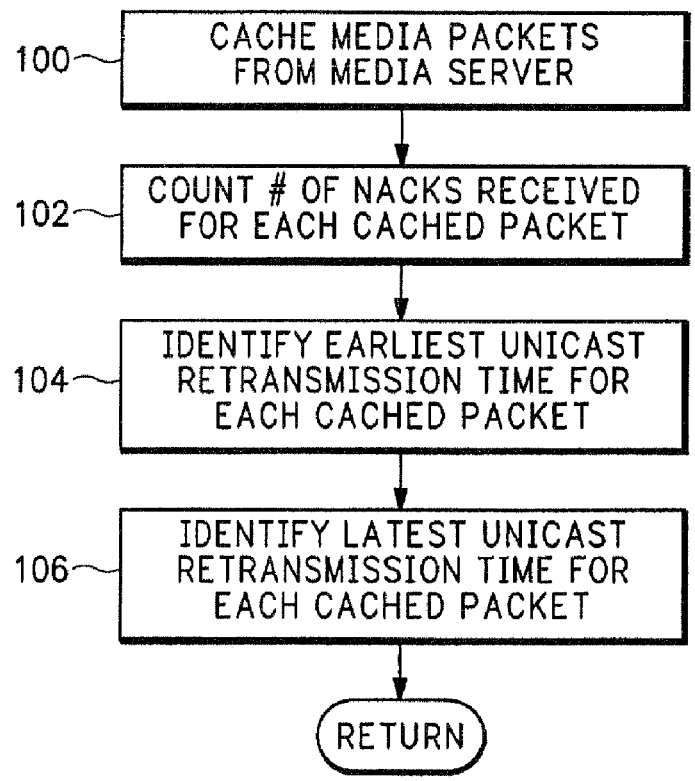
FIG. 5 is a flow diagram showing different parameters used by the hybrid packet repair scheme.

Referring to FIGS. 2 and 5, the repair point 16 in operation 100 caches the media packets 24A received from the media server 14. For each cached packet 24A that might be used to construct a unicast retransmission 32 or multicast retransmission 34, the repair point 16 in operation 102 counts the number of NACKs 26 received for the cached packet 24A.

The NACK count 66 is initialized to zero when the packet 24A is initially cached. When a NACK 26 is received, the cached packets 24A being NACKed are ascertained from a sequence number and bit map in the NACK 26. Accordingly, the NACK count 66 for an associated lost packet 64 is incremented by one for each received NACK.

In operation 104, an earliest unicast retransmission time is identified for each cached packet 24A based on a cache delay and a configured estimate of the playout point the receivers 50 use for the media channel 22. There may be some time period between when a receiver 50 identifies a lost media packet 24 and when that lost media packet needs to be played out by the receiver 50. For instance, a jitter buffer in the receiver 50 may provide a predetermined delay period from when a packet 24 is received to when the packet is played out. The repair point 16 may use some of this delay period to further analyze the NACK patterns in table 62 prior retransmitting a lost packet.

The idea is to avoid unicast retransmissions 32 when multicast retransmissions 34 or FEC 36 would be more effective. Accordingly, the repair point 16 monitors the NACKs 26 for some time window to provide an opportunity for multiple NACKs 26 to arrive. The time period in operation 104 is selected to be short enough so that retransmission repair completes before the NACKing receiver 50 needs to playout the repair packet. This time period also accounts for network transmission delay and any delay in receiving the packet in retransmission cache 60.

Similarly, a latest unicast retransmission time for the lost packet is identified in operation 106 based on the same network parameters mentioned. The latest retransmission time indicates whether the deadline has passed for usefully repairing a media stream with the cached packet 24A. In other words, if the repair point 16 cannot send the cached packet 24A to the receiver 50 in time to be played out at the proper moment, then there is no utility in sending the retransmission packet. Accordingly, the hybrid packet repair scheme 20 may make repair decisions prior to expiration of the time period in operation 106.

Receiver Density

Figure 6:
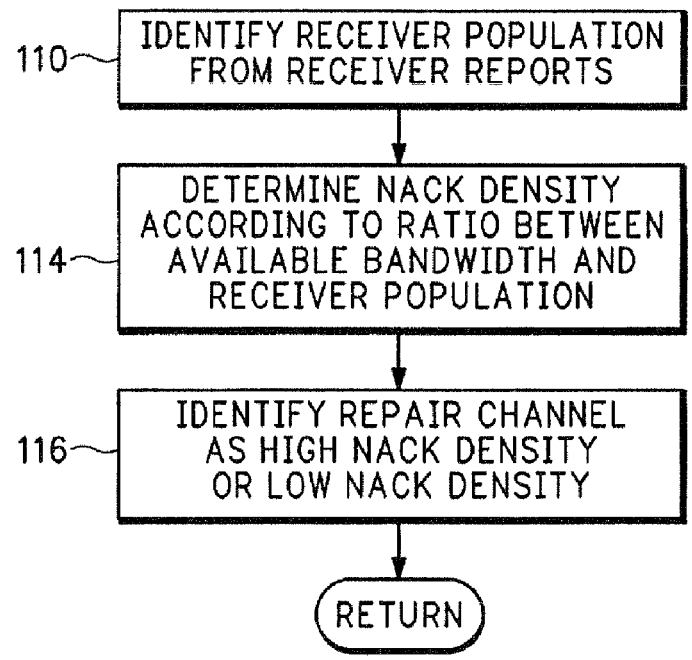
FIG. 6 is a flow diagram showing how the hybrid packet repair scheme determines a NACK density.

Referring to FIGS. 2 and 6, the repair point 16 may need to know the upper bound for NACKs 26 received on channel 28. The repair point 16 is configured with information for the feedback control channel 28 such as the available IP bandwidth inbound from the receivers 50. The repair point in operation 110 also identifies the number of receivers 50 actively receiving the media packets 22 (receiver population) through the RTCP receiver reports 58. The repair point can thereby ascertain if the bandwidth of feedback channel 28 could be exceeded if a large fraction of the receivers 50 sent NACKs 26 at the same time.

The repair point 16 in operation 114 computes a NACK density which may be the ratio of the available bandwidth of feedback channel 28 to the identified receiver population. There may be a lower bound of 1 to cover the case when more than enough bandwidth is available to handle all the receivers 50. The NACK density computed in operation 114 is used to scale the impact of the NACKs 26 that are successfully received and processed by the repair point 16. The NACK density is periodically recomputed in operation 114 using the current receiver population estimate in operation 110.

In one embodiment, the NACK density is classified as either high density or low density in operation 116. For example, a high NACK density is selected when the NACK density is above the range 1-1.5 and the low NACK density is selected when the NACK density is below this range. This high or low classification is used in one embodiment described below when determining which scheme to use for repairing the lost media packets.

NACK Density Based Repair Schemes

The hybrid packet repair scheme 20 may maintain, on a per channel basis, a retransmission bandwidth budget, represented as a fraction of the original stream bandwidth. For example, the repair scheme 20 might be configured to allow each media stream 22 (FIG. 2) to use an additional 20% over its native bandwidth for unicast or multicast retransmissions 32, 34, and/or for FEC 36. By knowing the bandwidth of native media stream 22, the repair point 16 can then ascertain an upper bound on the amount of available repair bandwidth.

Figure 7:
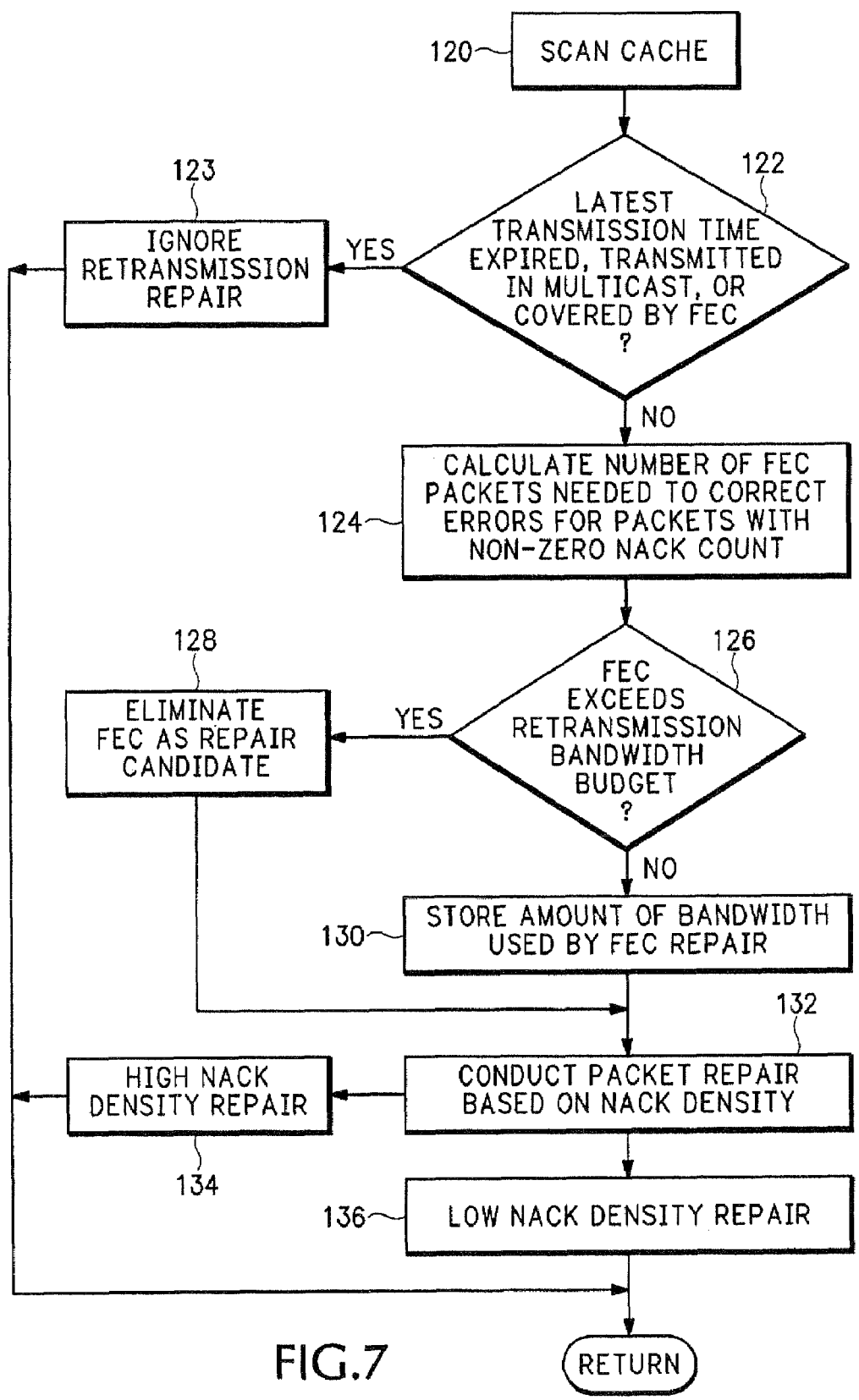
FIG. 7 is a flow diagram showing how the hybrid packet repair scheme considers different error correction and network parameters when selecting particular repair schemes.

Referring to FIGS. 2 and 7, the retransmission cache 60 may be scanned every few milliseconds in operation 120. Packets whose latest retransmission time has expired, which have already been transmitted by multicast, or have been covered by an FEC operation are identified in operation 122 and ignored in operation 123.

The hybrid repair scheme in operation 124 determines if FEC would be the most effective technique for repairing the current set of errors. First the number of FEC packets are counted that would be needed to correct all lost packets with a non-zero NACK count. If the total bandwidth for the calculated number of FEC packets exceeds the retransmission bandwidth budget in operation 126, FEC is eliminated as a current repair mechanism candidate in operation 128. If FEC does fit within the bandwidth budget, the amount of bandwidth used for FEC is stored in operation 130 and considered later in repair operation 132. A high NACK density repair scheme is used in operation 134 when a high NACK density was identified in operation 116 of FIG. 6 and a low NACK density repair scheme is used in operation 136 when a low NACK density was identified in operation 116.

Low NACK Density

Figure 8:
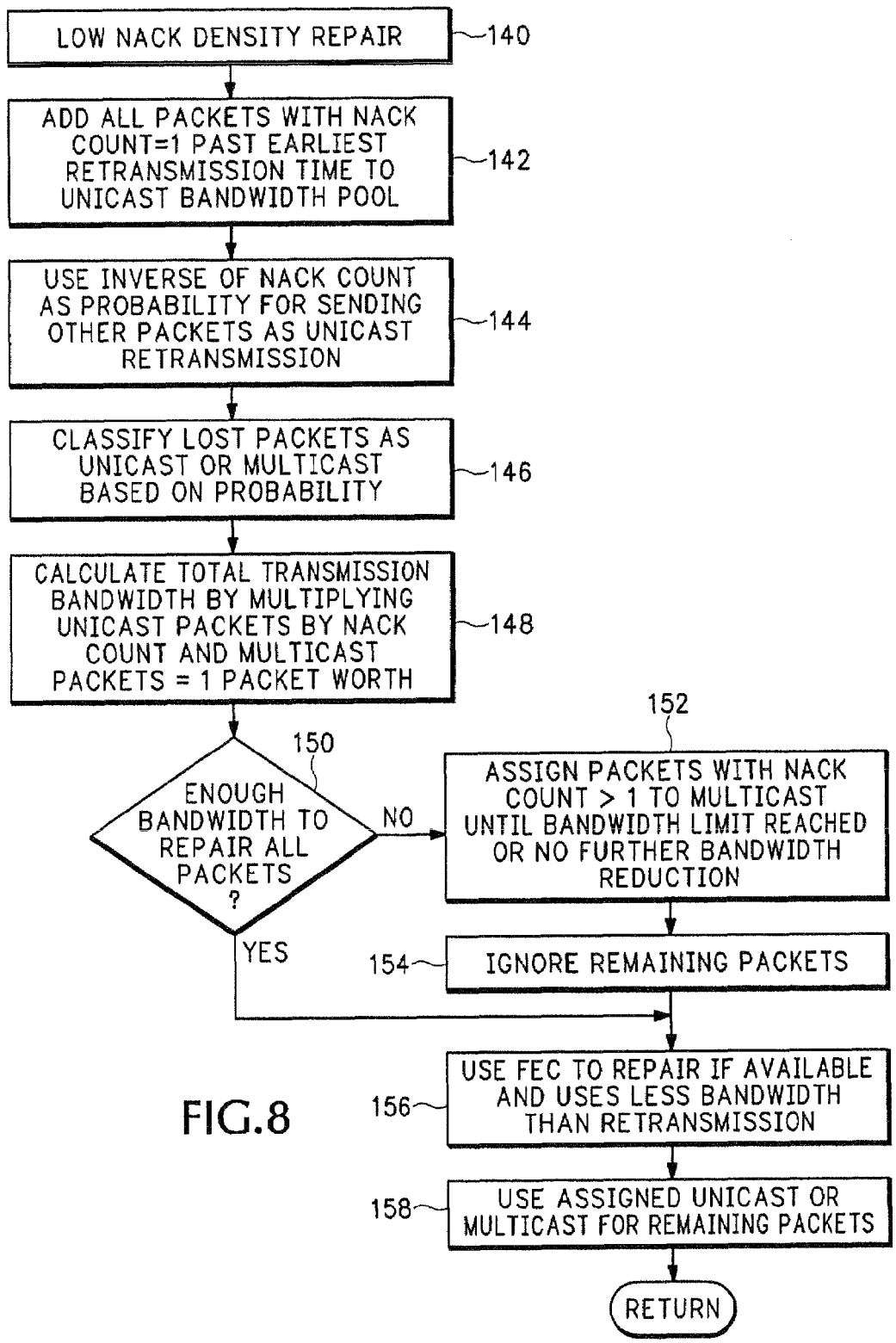
FIG. 8 is a flow diagram showing how the hybrid packet repair scheme may operate with a low NACK density.

Referring to FIG. 8, a low NACK density is identified in operation 140 (see FIG. 6). After the earliest retransmission time has passed (see operation 104 in FIG. 5), all packets identified in NACK table 62 with a NACK count of 1 are added to a unicast bandwidth pool in operation 142. These packets are added to the unicast pool because it is highly likely based on the low NACK density that only one receiver would be interested in this packet.

The inverse of the NACK count is used in operation 144 as a probability for using unicast retransmission to repair other lost packets. In other words, as the NACK count increases, there is a lower probably of using unicast retransmission to repair the lost packet. Based on the calculated probabilities, the lost packets are identified as either candidates for unicast or multicast retransmission in operation 146.

The total estimated required bandwidth is then calculated in operation 148. If a packet is selected for unicast retransmission, the estimated transmission bandwidth used is multiplied by the associated NACK count 66. Otherwise, the packet is selected for multicast retransmission and the transmission bandwidth is estimated at 1 packet.

If there is insufficient bandwidth to accommodate retransmitting all the lost packets in operation 150, a fall back scheme assigns all packets with a NACK count>1 to multicast retransmission in operation 152. The reassigned packets are each counted as using a single packet's worth of bandwidth. Unicast candidate packets are reassigned as multicast retransmissions in operation 152 until the bandwidth limit is reached. Remaining packets that still do not fit in the budget are considered un-repairable and ignored in operation 154.

When sufficient bandwidth exists in operation 150, or after completing operation 154, FEC may be applied in operation 156. If FEC is available and uses less bandwidth than the selected retransmission scheme, then FEC packets 36 may be sent instead of retransmitting packets. Otherwise, the assigned unicast or multicast retransmission scheme is used to send the lost packets to the receives in operation 158.

High NACK Density

Figure 9:
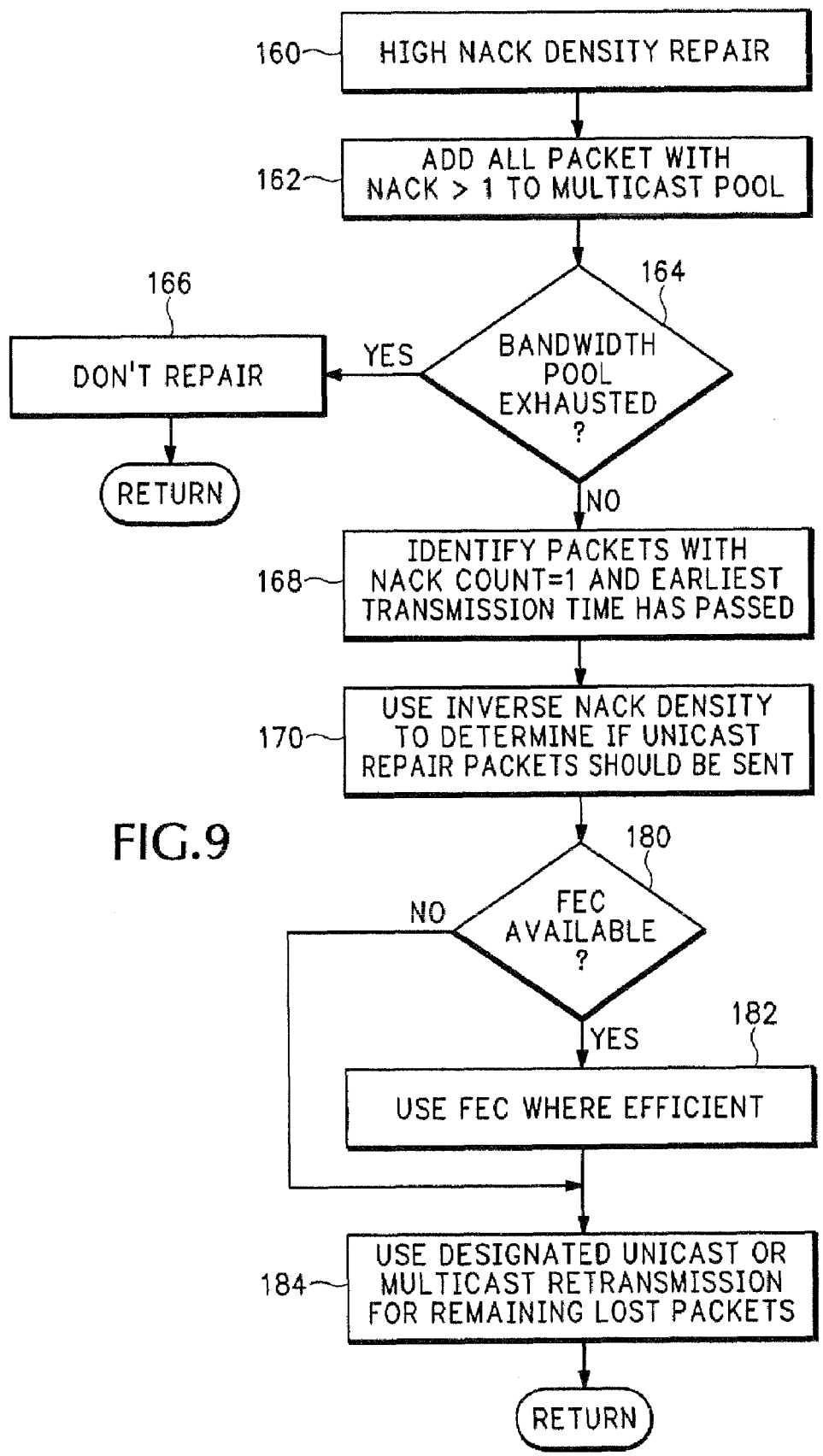
FIG. 9 is a flow diagram showing how the hybrid packet repair scheme may operate with a high NACK density.

Referring to FIGS. 2 and 9, the high density algorithm may have less NACK information to work with and therefore is conservative about using unicast since correlated errors may tend to cause NACK implosions. The high NACK density repair scheme is identified in operation 160 pursuant to the analysis in FIGS. 5, 6, and 7. All packets with a NACK count in table 62 greater than one are added to the multicast bandwidth pool in operation 162. If the bandwidth pool is exhausted before all the identified lost packets are added to the bandwidth pool in operation 164, then the packet repair is aborted in operation 166. In this case it is unlikely the repair operations will improve the media stream. For example, so many packets may have been lost by so many receivers that given the limits on repair bandwidth attempting repair probably would not substantially correct the media stream and possibly could cause additional packet loss in the native media stream 22.

If the repair bandwidth pool is not exhausted in operation 164, then packets with a NACK count of one whose earliest retransmission time has passed are then considered for unicast retransmission in operation 168. The inverse of the NACK density calculated in FIG. 6 is used in operation 170 as the probability value to determine whether to schedule the single NACK count packets for unicast retransmission. In other words, the higher the NACK density, the less likely that any unicast retransmissions will be used.

Once the packets are classified, if FEC is an option in operation 180 and uses less bandwidth than multicast retransmission, the error is repaired with FEC in operation 182. Otherwise the packets are repaired using the designated multicast or unicast repair in operation 184.

Receiver Repair Considerations

The receivers 50 (FIG. 2) may indicate in the NACKs 26 whether or not they have local FEC repair capability. For example, particular receivers 50 may not have the processing capacity to effectively correct packets using FEC. These receivers 50 would then provide an identifier 27 in any sent NACKs 26A that indicates lack of FEC capability. The hybrid packet repair scheme 20 described above would then adjust the selected repair scheme according to the FEC indications 27 so that no FEC packets 36 are sent to receivers 50 with no FEC correction capability. For example, in the schemes described above, the FEC option would not be considered for any receivers 50 sending NACKs 27A and only unicast retransmission 32 or multicast retransmission 34 would be used for associated packet loss correction.

A popularity (or priority) metric could also be associated with individual multicast streams 22, and repair precedence could be given to the higher popularity streams. Repair preference would then be based on the order of decreasing priority. Alternatively, a "RED" scheme could skip a few streams randomly. The scheme could be used for any multimedia multicast service including any video or audio information.

Thus, the hybrid adaptive repair scheme uses unicast retransmission, multicast retransmission, and FEC to repair RTP multicast sessions. The scheme is highly robust; saves bandwidth; is highly adaptable to various access network configurations, receiver densities, and available bandwidth; and deals with upstream losses in a way that avoids control channel overhead or constant downstream bandwidth usage as would be required by a pure FEC solution.

Several preferred examples of the present application have been described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. An apparatus, comprising:
one or more processors; and
a memory coupled to the one or more processors comprising instructions executable by the processors, at least one of the processors operable, when executing the instructions, to:
store packets from a media stream;
monitor lost packet notices identifying lost packets from the media stream;
increment a lost packet counter entry in a table each time a lost packet notice is received, wherein the table identifies the lost packets and the lost packet counter counts a number of receivers that have lost the packets;
determine a number and pattern of the identified lost packets based on entries in the table;
select one or more different schemes for repairing or retransmitting the identified lost packets to one or more receivers in a network according to the number and pattern of the identified lost packets; and
retransmit one or more of the identified lost packets to one or more receivers according to the selected one or more different schemes for repair or retransmission of the identified lost packets from the media stream.

2. The apparatus according to claim 1 wherein at least one of the processors select between one or more of unicast retransmissions, multicast retransmissions, and forward error correction for repairing or retransmitting the identified lost packets.

3. The apparatus according to claim 2 wherein at least one of the processors use the multicast retransmissions for repairing certain correlated lost packets and use the unicast retransmissions for repairing certain uncorrelated lost packets.

4. The apparatus according to claim 2 wherein at least one of the processors use the unicast retransmissions for packets lost by a relatively small number of receivers and use the multicast retransmissions for packets lost by a relatively large number of receivers.

5. The apparatus according to claim 2 wherein at least one of the processors send Forward Error Correction (FEC) packets when multiple different lost packets can be corrected with the same FEC packets and sending the FEC packets is more bandwidth efficient than retransmitting the identified lost packets.

6. The apparatus according to claim 1 including:
a retransmission cache for storing the packets from the media stream;
wherein at least one of the processors either retransmits the packets in the retransmission cache corresponding to the identified lost packets or sends error correction packets for repairing the identified lost packets according to which packets and how many of the packets are identified as lost in the table, or combination thereof.

7. The apparatus according to claim 1 wherein at least one of the processors periodically identify a number of receivers that are actively receiving the media stream and select between the different schemes according to the identified number of receivers.

8. The apparatus according to claim 7 wherein at least one of the processors apply a higher weight to multicasting packet retransmissions when there is a relatively high receiver density and more evenly weight unicasting and multicasting packet retransmissions when there is a relatively low receiver density.

9. The apparatus according to claim 1 wherein at least one of the processors identify Forward Error Correction (FEC) indicators in at least some of the received lost packet notices that identify a capability of associated receivers for performing FEC, the processors then selecting whether or not to use FEC as the scheme for repairing the identified lost packets according to the FEC indicators in the associated lost packet notices.

10. A computer-readable medium having instructions stored thereon, wherein when the instructions are executed by at least one device, the instructions configure the at least one device to:
receive Negative ACKnowledgment (NACK) messages identifying packets lost from a media stream;
analyze a distribution of the identified lost packets;

identify a population of receivers actively receiving the media stream;

compare the identified receiver population with an amount of network bandwidth available for packet repair and determine a notification density indicating a probability that lost packet messages will be successfully received; and select between different forward error correction (FEC), unicast or multicast retransmission schemes, or combinations thereof for retransmitting or repairing the identified lost packets according to the notification density.

11. The computer-readable medium according to claim 10 wherein when the instructions are executed by the at least one device, the instructions further configure the at least one device to:

send forward error correction packets when at least some of the identified lost packets can be corrected using forward error correction; and otherwise retransmit the identified lost packets using unicast or multicast retransmission schemes, or combinations thereof.

12. The computer-readable medium according to claim 11 wherein when the instructions are executed by the at least one device, the instructions further configure the at least one device to:

send unicast retransmissions when a relatively small number of receivers lose a relatively small number of packets; and send multicast retransmissions when a relatively large number of receivers lose the same packets.

13. The computer-readable medium according to claim 10 wherein when the instructions are executed by the at least one device, the instructions further configure the at least one device to:

scan a list identifying the lost packets;

forego retransmission repair for the identified lost packets that have expired latest transmission times, that have been previously retransmitted as multicast packets, or that can be repaired using forward error correction;

calculate a number of forward error correction packets needed to correct the identified lost packets;

eliminate the forward error correction scheme when the calculated number of forward error correction packets exceeds a retransmission bandwidth budget; and identify an amount of bandwidth required for forward error correction and use the identified amount of bandwidth when selecting the different unicast or multicast packet retransmission or forward error correction schemes.

14. The computer-readable medium according to claim 10 wherein a low density packet repair scheme includes further instructions to configure the at least one device to:

classify the identified lost packets associated with a single lost packet message as unicast retransmission candidates;

classify remaining identified lost packets as either unicast retransmission candidates or a multicast retransmission candidates according to the number of associated identified lost packet messages;

calculate the total bandwidth required to repair all of the identified lost packets according to their candidate classification; and repeatedly reassign at least some of the identified lost packets previously classified as unicast retransmission candidates as multicast retransmission candidates until the calculated bandwidth is below a predetermined threshold.

15. The computer-readable medium according to claim 10 wherein a high density packet repair scheme includes further instructions to configure the at least one device to:

classify the identified lost packets associated with more than one lost packet message as multicast retransmission candidates; and use a number of devices actively receiving an associated media stream and an amount of bandwidth available for repairing the identified lost packets when classifying other identified lost packets with a single lost packet message as unicast retransmission candidates or multicast retransmission candidates.

16. An apparatus, comprising:

one or more processors configured to;

receive a media stream and send back Negative ACKnowledgments (NACKs) for any identified lost media packets from the media stream, the one or more processors then receiving back different types of packet repair schemes for repairing or replacing the lost media packets according to a receiver population and a correlation status with other receivers losing media packets; and send periodic Real Time Control Protocol (RTCP) receiver reports;

wherein the receiver population is indicated by RTCP receiver reports; and wherein the correlation status indicates how different packet losses identified by a portion of the receiver population are related to each other.

17. The apparatus according to claim 16 wherein the one or more processors receive a unicast retransmission scheme, a multicast retransmission scheme, a Forward Error Correction (FEC) scheme, or combinations thereof for repairing the lost media packets.

18. The apparatus according to claim 17 wherein the one or more processors send a no-FEC message to prevent the FEC scheme from being sent to repair the lost media packets.

19. An apparatus, comprising:

one or more processors configured to receive a media stream and send back Negative ACKnowledgments (NACKs) for any identified lost media packets from the media stream, the one or more processors then receiving back different types of packet repair schemes for repairing or replacing the lost media packets according to a receiver population and a correlation status with other receivers losing media packets;

wherein the one or more processors receive either a unicast retransmission scheme, a multicast retransmission scheme, or a Forward Error Correction (FEC) scheme for repairing the lost media packets;

the media stream has a primary Multicast Real Time Protocol (RTP) session along with a corresponding Real Time Control Protocol (RTCP) control channel and a unicast repair RTP/RTCP session;

the unicast repair RTP/RTCP session is used for sending unicast repair packets when the unicast retransmission scheme is selected for repairing the lost packets; and a second SSM RTP/RTCP multicast session is used for sending multicast repair packets when the multicast retransmission scheme is selected for repairing the lost packets.

* * * * *

UNITED STATES PATENT AND TRADEMARK OFFICE
CERTIFICATE OF CORRECTION

| | | |
|---|---|---|
| PATENT NO. | : 7,681,101 B2 | Page 1 of 1 |
| APPLICATION NO. | : 11/735930 | |
| DATED | : March 16, 2010 | |
| INVENTOR(S) | : Oran et al. | |

It is certified that error appears in the above-identified patent and that said Letters Patent is hereby corrected as shown below:

At page 1, section 75, please replace "David Oran" with --David R. Oran--.
At column 10, line 28, please replace "send" with --sends--.
At column 10, line 41, please replace "combination" with --combinations--.

Signed and Sealed this
Third Day of May, 2011

David J. Kappos
*Director of the United States Patent and Trademark Office*